(12) United States Patent
Son et al.

(10) Patent No.: US 11,155,306 B2
(45) Date of Patent: Oct. 26, 2021

(54) VEHICLE SIDE OUTER STRUCTURE

(71) Applicants: Hyundai Motor Company, Seoul (KR); Kia Motors Corporation, Seoul (KR)

(72) Inventors: Kyung Hoon Son, Suwon-si (KR); Young Ho Lee, Gunpo-si (KR); Hee Suk Chung, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/939,346

(22) Filed: Jul. 27, 2020

(65) Prior Publication Data

US 2021/0171112 A1    Jun. 10, 2021

(30) Foreign Application Priority Data

Dec. 5, 2019  (KR) .......................... 10-2019-0160945

(51) Int. Cl.
  *B62D 25/02*  (2006.01)
  *B60K 15/05*  (2006.01)
  *B62D 29/04*  (2006.01)
  *B62D 27/06*  (2006.01)

(52) U.S. Cl.
  CPC ............. *B62D 25/02* (2013.01); *B60K 15/05* (2013.01); *B62D 27/065* (2013.01); *B62D 29/043* (2013.01)

(58) Field of Classification Search
  CPC .... B62D 25/02; B62D 29/043; B62D 27/065; B62D 27/06; B62D 27/026; B62D 29/007; B60K 15/05; B60J 10/45; B60J 10/36
  USPC ..................................................... 296/193.05
  See application file for complete search history.

(56) References Cited

U.S. PATENT DOCUMENTS

| | | | |
|---|---|---|---|
| 7,364,225 B2* | 4/2008 | Tomioka | B62D 25/02 296/193.05 |
| 7,717,499 B2* | 5/2010 | Fioravanti | B62D 25/087 296/203.04 |
| 2012/0200119 A1* | 8/2012 | Juettner | B62D 25/02 296/193.05 |
| 2014/0246881 A1* | 9/2014 | Hasegawa | B62D 29/043 296/191 |
| 2015/0251701 A1* | 9/2015 | Sugano | B62D 25/02 296/193.05 |
| 2016/0083018 A1* | 3/2016 | Anegawa | B62D 25/04 296/193.05 |
| 2017/0233008 A1* | 8/2017 | Otsuka | B62D 21/02 296/193.05 |
| 2018/0273110 A1* | 9/2018 | Masuda | B62D 25/02 |

\* cited by examiner

*Primary Examiner* — Pinel E Romain
(74) *Attorney, Agent, or Firm* — Slater Matsil, LLP

(57) ABSTRACT

A vehicle side outer structure includes a master side outer panel having a front door opening and a rear door opening, and a quarter garnish panel joined to a rear edge of the master side outer panel, wherein the quarter garnish panel is configured to be changeable in response to a partial design change of a vehicle.

20 Claims, 17 Drawing Sheets

VEHICLE SIDE OUTER STRUCTURE

CROSS-REFERENCE TO RELATED APPLICATIONS

This application claims priority to Korean Patent Application No. 10-2019-0160945, filed in the Korean Intellectual Property Office on Dec. 5, 2019, which application is hereby incorporated herein by reference.

TECHNICAL FIELD

The present disclosure relates to a vehicle side outer structure.

BACKGROUND

A vehicle has a side outer panel. The side outer panel is a component located on the exterior of a vehicle body, and forms an exterior design of the vehicle. In addition, the side outer panel is designed to block water, dust, noise, etc. from being transmitted to an interior space of the vehicle.

In the past when the mold technology was not developed, the side outer panel has been configured such that a plurality of individually manufactured pieces are assembled by welding and/or the like.

In recent years, the side outer panel is manufactured in one piece in order to improve productivity with the development of the mold technology. Such a one-piece side outer panel is advantageous to the supplier-oriented mass production system.

Meanwhile, various body types have been developed in order to flexibly respond to changes in customer needs and market environment, and partial design changes have been made even in the same vehicle model.

In order to manufacture side outer panels in response to various body types and partial design changes, new molds are individually required, and new investment costs are excessively required.

The above information described in this background section is provided to assist in understanding the background of the inventive concept, and may include any technical concept which is not considered as the prior art that is already known to those skilled in the art.

SUMMARY

The present disclosure relates to a vehicle side outer structure. Particular embodiments relate to a vehicle side outer structure capable of efficiently responding to partial design changes depending on various body types and vehicle models.

Embodiments of the present disclosure have been made to solve problems occurring in the prior art while advantages achieved by the prior art are maintained intact.

An embodiment of the present disclosure provides a vehicle side outer structure capable of efficiently responding to partial design changes depending on various body types and vehicle models.

According to an embodiment of the present disclosure, a vehicle side outer structure may include a master side outer panel having a front door opening and a rear door opening, and a quarter garnish panel joined to a rear edge of the master side outer panel, wherein the quarter garnish panel may be changeable in response to a partial design change of a vehicle.

The quarter garnish panel may be made of a synthetic resin material.

The vehicle side outer structure may further include a quarter outer panel sealably coupled to the rear edge of the master side outer panel. The quarter garnish panel may be coupled to the quarter outer panel using a plurality of fasteners.

The master side outer panel and the quarter outer panel may be made of a same metal material.

The quarter outer panel may have a plurality of first mounting holes, the quarter garnish panel may have a plurality of first mounting lugs, a clip may be fastened to each first mounting hole and its corresponding first mounting lug, and a sealing pad may be disposed around the clip.

The quarter outer panel may have a plurality of second mounting holes, the quarter garnish panel may have a plurality of second mounting lugs, and a screw may be fastened to each second mounting hole and its corresponding second mounting lug.

The clip and the screw may be fastened in different directions.

The quarter outer panel may have a rear extension, and the rear extension and the quarter outer panel may form a unitary one-piece structure.

The vehicle side outer structure may further include a quarter inner panel located inward from the quarter outer panel. A front edge of the quarter inner panel may be joined to the rear edge of the master side outer panel, and a rear edge of the quarter inner panel may be joined to a rear edge of the quarter outer panel.

The quarter outer panel may have a reinforcing bead, and the reinforcing bead may be recessed toward the interior of the vehicle or be raised toward the exterior of the vehicle.

A plurality of exterior components may be mounted on the quarter garnish panel.

The plurality of exterior components may include a quarter fixed garnish, a quarter side garnish, a bumper side mounting bracket, and a fuel door housing having a fuel door.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
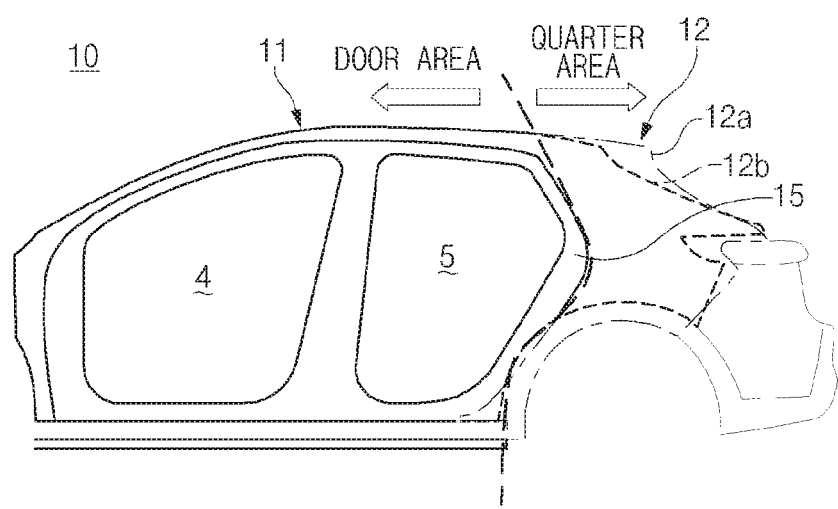
FIG. 1 illustrates a side view of a vehicle side outer structure according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle side outer structure 10 according to an exemplary embodiment of the present disclosure may include a master side outer panel 11 and a quarter garnish panel 12 connected to the rear of the master side outer panel 11.

The master side outer panel 11 may have a front door opening 4 and a rear door opening 5. A front door may be openably mounted in the front door opening 4, and a rear door may be openably mounted in the rear door opening 5.

The master side outer panel 11 may correspond to a door area that is hardly changed in shape, dimension, and the like, regardless of various body types and partial design changes of the vehicle. In particular, the master side outer panel 11 may be a common area regardless of the partial design changes of the vehicle.

For example, the master side outer panel 11 may be made of a metal material such as steel to secure strength and stiffness.

The quarter garnish panel 12 may correspond to a quarter area that is significantly changed in shape, dimension, and the like so as to respond to various body types and partial design changes of the vehicle. Thus, the quarter garnish panel 12 may have different shapes depending on vehicle models. For example, an A-type vehicle may be provided with an A-type quarter garnish panel 12a, and a B-type vehicle may be provided with a B-type quarter garnish panel 12b.

For example, the quarter garnish panel 12 may be made of a synthetic resin material such as plastic to facilitate changes in shape, dimension, and the like.

Figure 2:
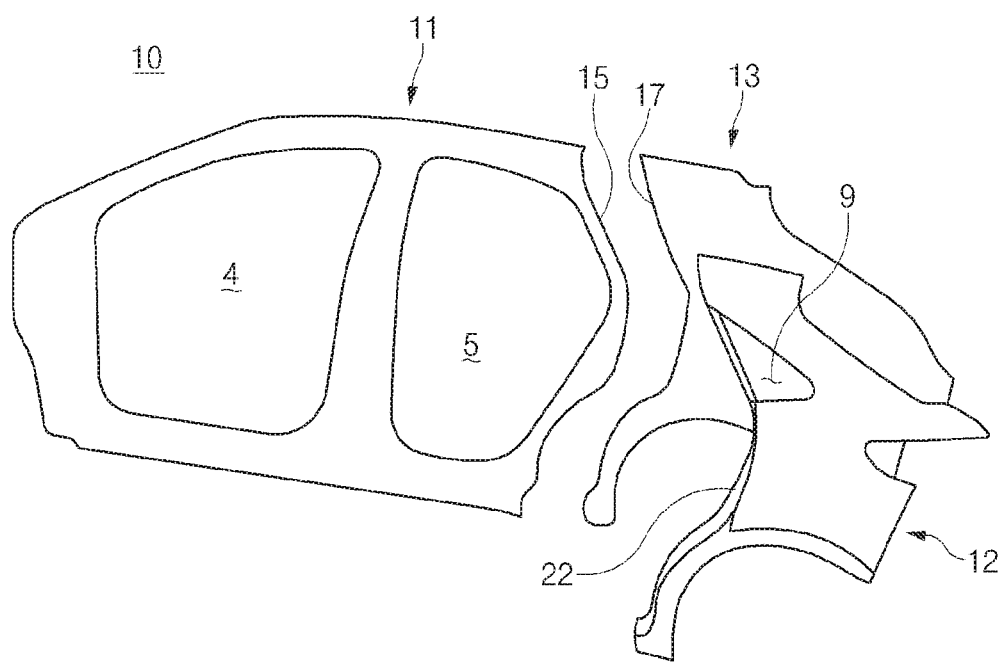
FIG. 2 illustrates an exploded view of a vehicle side outer structure according to an exemplary embodiment of the present disclosure.
Figure 3:
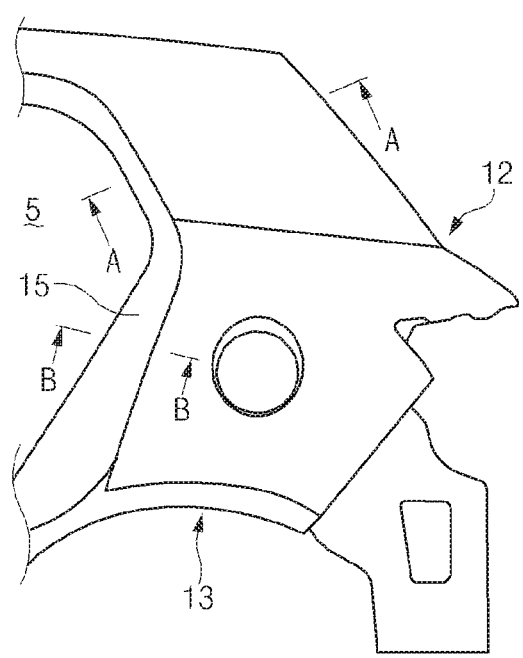
FIG. 3 illustrates a rear portion of a vehicle side outer structure according to an exemplary embodiment of the present disclosure.
Figure 4:
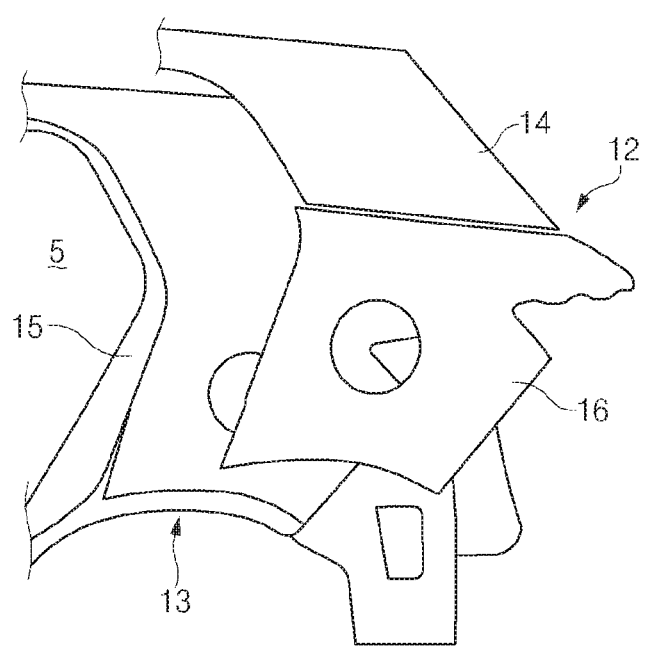
FIG. 4 illustrates a quarter outer panel and a quarter garnish panel of a vehicle side outer structure according to an exemplary embodiment of the present disclosure.

Referring to FIGS. 2 to 4, the vehicle side outer structure 10 according to an exemplary embodiment of the present disclosure may include a quarter outer panel 13 joined to a rear edge 15 of the master side outer panel 11. In particular, a front edge 17 of the quarter outer panel 13 may be joined to the rear edge 15 of the master side outer panel 11 by welding, using a structural adhesive, and/or the like to seal the rear edge 15 of the master side outer panel 11. For example, the quarter outer panel 13 may be made of a metal material such as steel to secure stiffness with respect to the quarter area of the vehicle. In particular, the quarter outer panel 13 may be made of the same material as that of the master side outer panel 11 so that sealability between the front edge 17 of the quarter outer panel 13 and the rear edge 15 of the master side outer panel 11 may be obtained.

Figure 9:
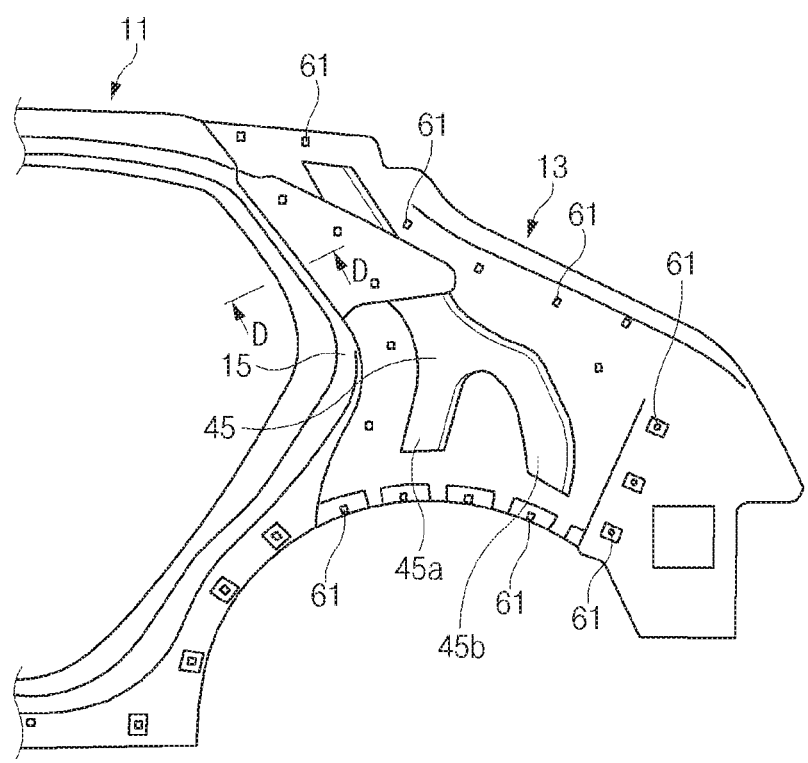
FIG. 9 illustrates a quarter outer panel coupled to a rear edge of a master side outer panel in a vehicle side outer structure according to an exemplary embodiment of the present disclosure.
Figure 11:
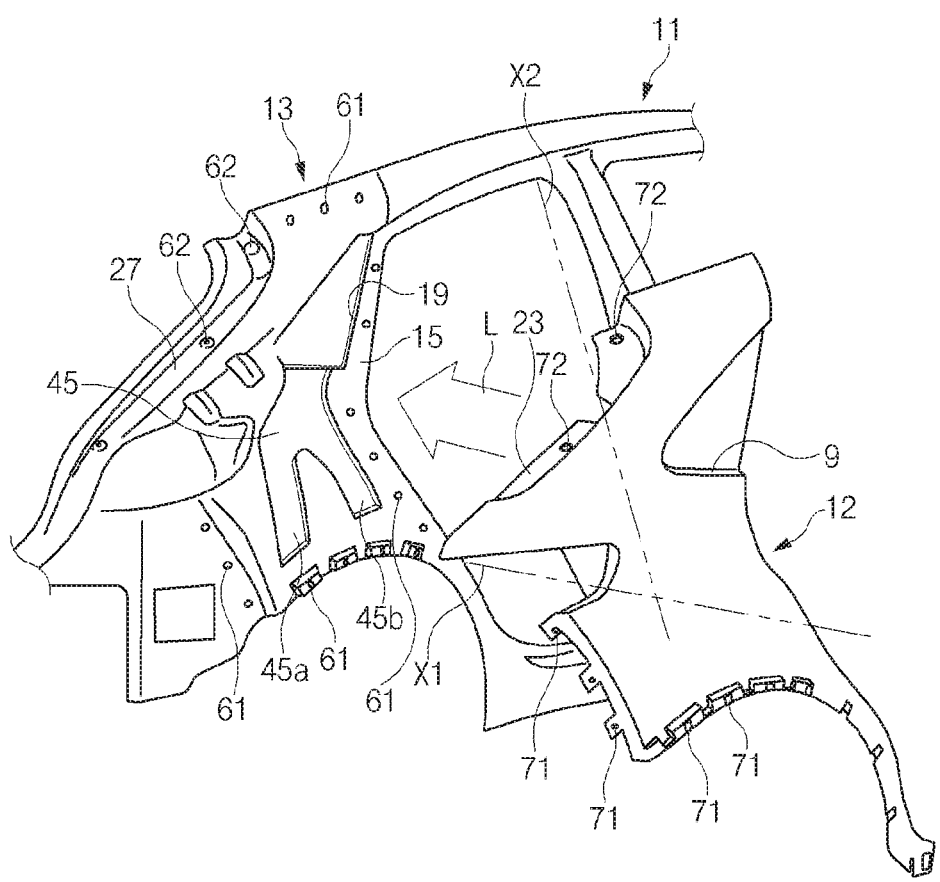
FIG. 11 illustrates a perspective view of a quarter outer panel and a quarter garnish panel of a vehicle side outer structure according to an exemplary embodiment of the present disclosure.

Referring to FIGS. 9 and 11, the quarter outer panel 13 may have reinforcing beads 45, 45a, and 45b, and the stiffness of the quarter outer panel 13 may be increased by the reinforcing beads 45, 45a, and 45b. The reinforcing beads 45, 45a, and 45b may be formed by a press method such as embossing and stamping, and the reinforcing beads 45, 45a, and 45b may be recessed toward the interior of the vehicle or be raised toward the exterior of the vehicle. For example, the reinforcing beads 45, 45a, and 45b may include a main bead 45 extending in a height direction of the vehicle, and two branch beads 45a and 45b branching off from the bottom of the main bead 45.

The quarter garnish panel 12 may be located outward from the quarter outer panel 13, and the quarter garnish panel 12 may be coupled to the quarter outer panel 13 using a plurality of fasteners such as clips, screws, and bolts. The quarter garnish panel 12 may be made of a synthetic resin material such as plastic, and the quarter garnish panel 12 may be formed to block chipping, dents, and the like. The quarter garnish panel 12 may include a plurality of garnish panels 14 and 16. For example, the quarter garnish panel 12 may include an upper garnish panel 14 and a lower garnish panel 16. The quarter outer panel 13 may face an interior surface of the quarter garnish panel 12, and the quarter garnish panel 12 may cover an exterior surface of the quarter outer panel 13.

Figure 5:
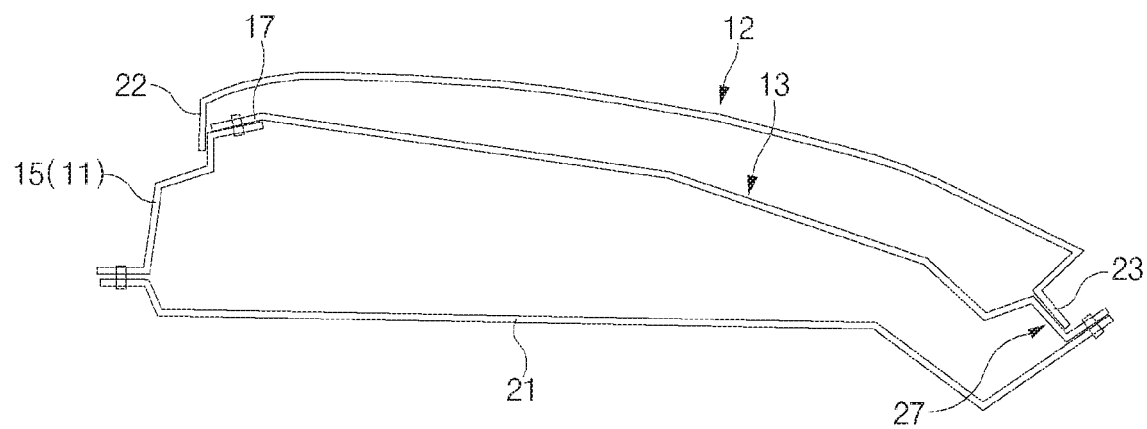
FIG. 5 illustrates a cross-sectional view, taken along line A-A of FIG. 3.
Figure 6:
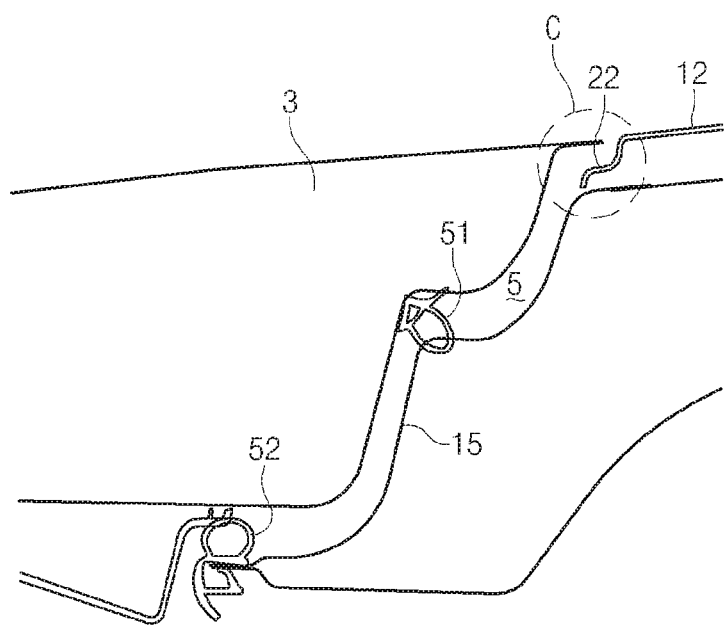
FIG. 6 illustrates a cross-sectional view, taken along line B-B of FIG. 3.

Referring to FIGS. 4 to 6, the front edge 17 of the quarter outer panel 13 may be coupled to the rear edge 15 of the master side outer panel 11 using fasteners and/or the like.

The rear edge 15 of the master side outer panel 11 may form a portion of a frame defining the rear door opening 5. A door-side seal member 51 may be mounted on a rear door 3, and a body-side seal member 52 may be mounted on the rear edge 15 of the master side outer panel 11. Thus, the rear door 3 and the rear edge 15 of the master side outer panel 11 may be sealed by the door-side seal member 51 and the body-side seal member 52. A quarter inner panel 21 may be located inward from the quarter outer panel 13, and a front edge of the quarter inner panel 21 may be coupled to the rear edge 15 of the master side outer panel 11 using fasteners and/or the like, and a rear edge of the quarter inner panel 21 may be coupled to a rear edge of the quarter outer panel 13 using the fasteners and/or the like.

Figure 7:
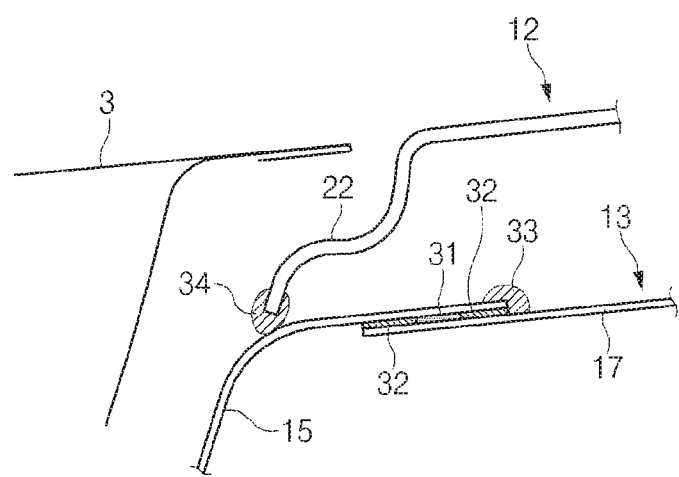
FIG. 7 illustrates an enlarged view of portion C of FIG. 6.

According to an exemplary embodiment, as illustrated in FIG. 7, the front edge 17 of the quarter outer panel 13 may overlap the rear edge 15 of the master side outer panel 11, and the front edge 17 of the quarter outer panel 13 and the rear edge 15 of the master side outer panel 11 may be joined by welding 31 and using a structural adhesive 32. In addition, the front edge 17 of the quarter outer panel 13 and the rear edge 15 of the master side outer panel 11 may be sealed by a sealing material 33 such as a sealer or a sealant.

Figure 10:
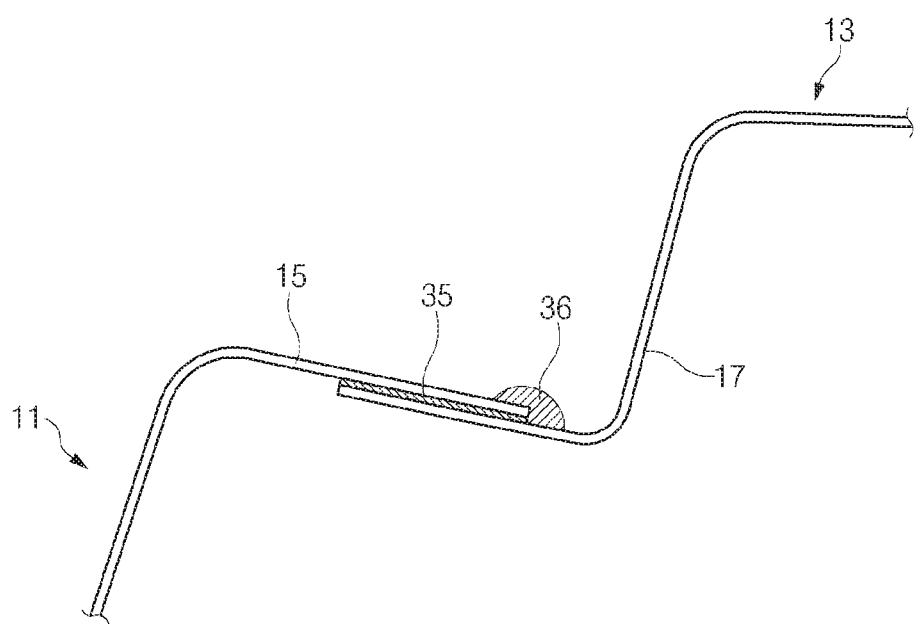
FIG. 10 illustrates a cross-sectional view, taken along line D-D of FIG. 9.

According to another exemplary embodiment, as illustrated in FIG. 10, the front edge 17 of the quarter outer panel 13 may overlap the rear edge 15 of the master side outer panel 11, and the front edge 17 of the quarter outer panel 13 and the rear edge 15 of the master side outer panel 11 may be joined by a structural adhesive 35. The front edge 17 of the quarter outer panel 13 and the rear edge 15 of the master side outer panel 11 may be sealed by a sealing material 36 such as a sealer or a sealant.

Figure 8:
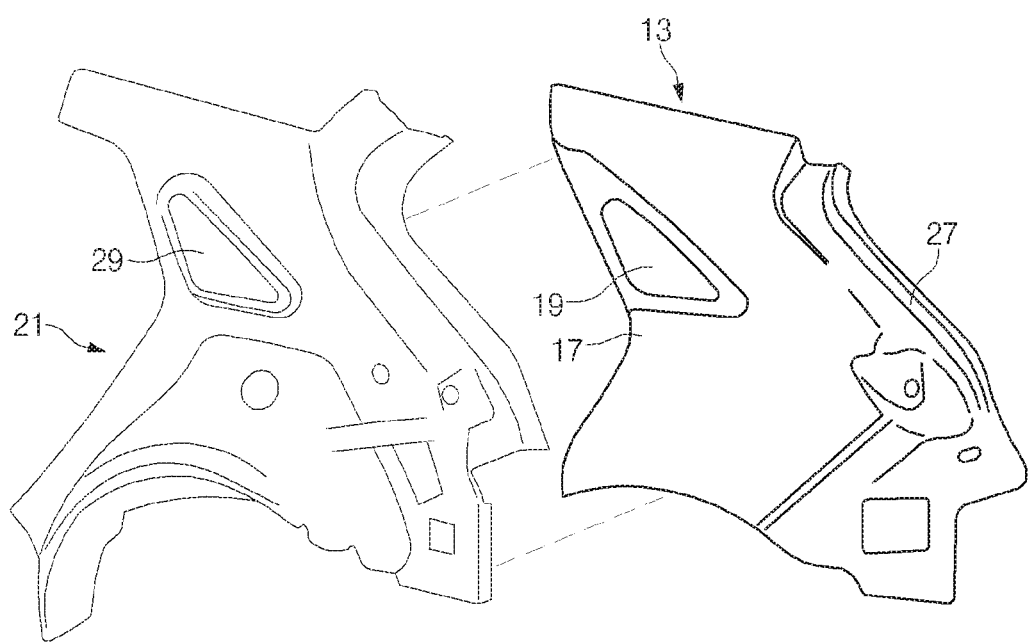
FIG. 8 illustrates a quarter inner panel and a quarter outer panel of a vehicle side outer structure according to an exemplary embodiment of the present disclosure.

Referring to FIGS. 5 and 8, the quarter outer panel 13 may have a rear extension 27 integrally connected to the rear edge thereof. That is, the quarter outer panel 13 and the rear extension 27 may form a unitary one-piece structure.

Referring to FIGS. 5 to 7, a front edge 22 of the quarter garnish panel 12 may cover an exterior surface of the master side outer panel 11. Referring to FIG. 7, the front edge 22 of the quarter garnish panel 12 and the rear edge 15 of the master side outer panel 11 may be sealed by a sealing material 34 such as a sealer or a sealant.

Referring to FIG. 5, a rear edge 23 of the quarter garnish panel 12 may be joined to the rear extension 27 by welding, using fasteners, and/or the like. The rear edge 23 of the quarter garnish panel 12 may extend to the rear extension 27, which improves the exterior styling of a rear opening such as a tailgate opening.

Referring to FIG. 2, the quarter garnish panel 12 may have an opening 9 for fixing quarter glass. Referring to FIG. 8, the quarter outer panel 13 may have an opening 19 corresponding to the opening 9 of the quarter garnish panel 12, and the quarter inner panel 21 may have an opening 29 corresponding to the opening 19 of the quarter outer panel 13.

The quarter outer panel 13 may have a plurality of first mounting holes 61 and a plurality of second mounting holes 62 as illustrated in FIGS. 9 and 11. The plurality of first mounting holes 61 may be formed in the edge of the quarter outer panel 13, and the plurality of second mounting holes 62 may be formed in the rear extension 27.

Figure 12:
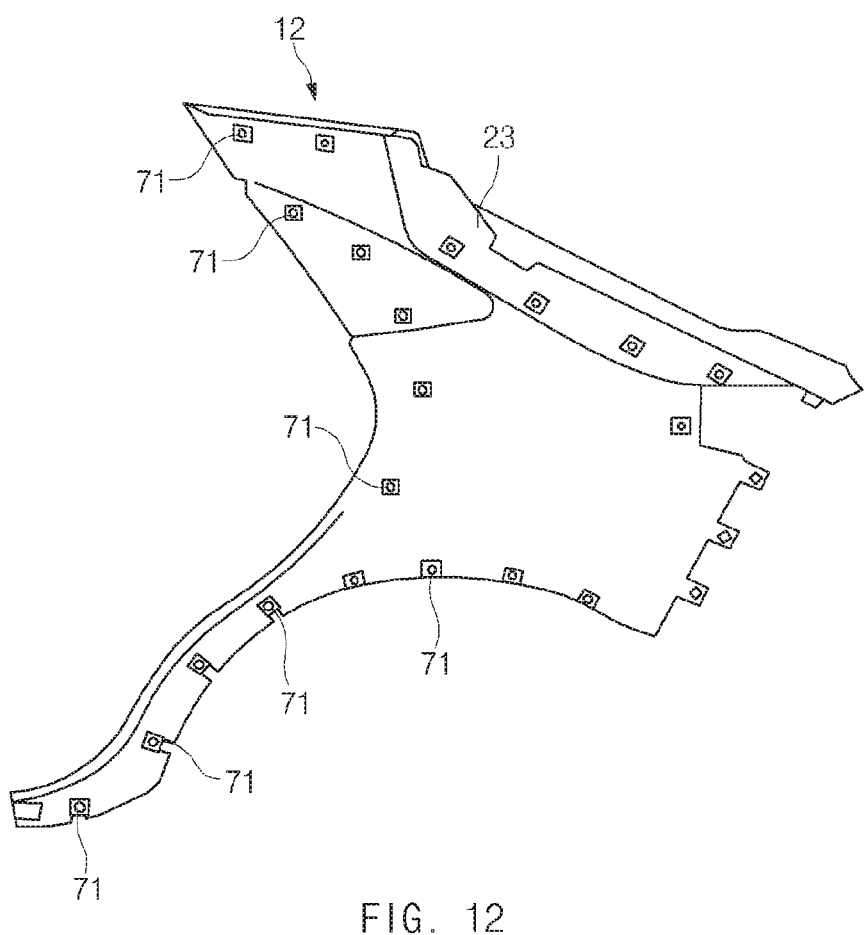
FIG. 12 illustrates a quarter garnish panel of a vehicle side outer structure according to an exemplary embodiment of the present disclosure.
Figure 13:
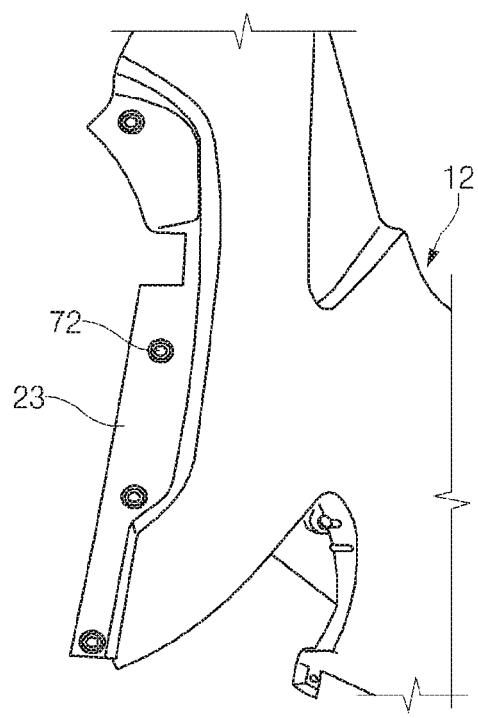
FIG. 13 illustrates a perspective view of a rear edge of a vehicle side outer structure according to an exemplary embodiment of the present disclosure.
Figure 14:
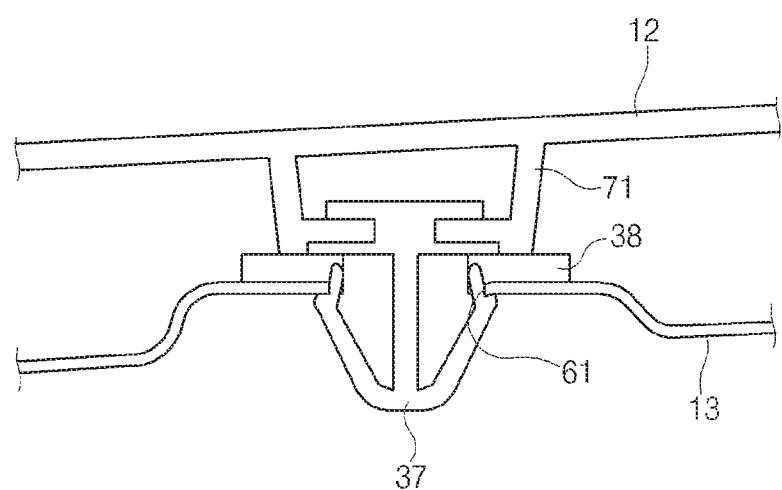
FIG. 14 illustrates the fastening of a clip to a first mounting hole of a quarter outer panel and a first mounting lug of a quarter garnish panel in a vehicle side outer structure according to an exemplary embodiment of the present disclosure.
Figure 15:
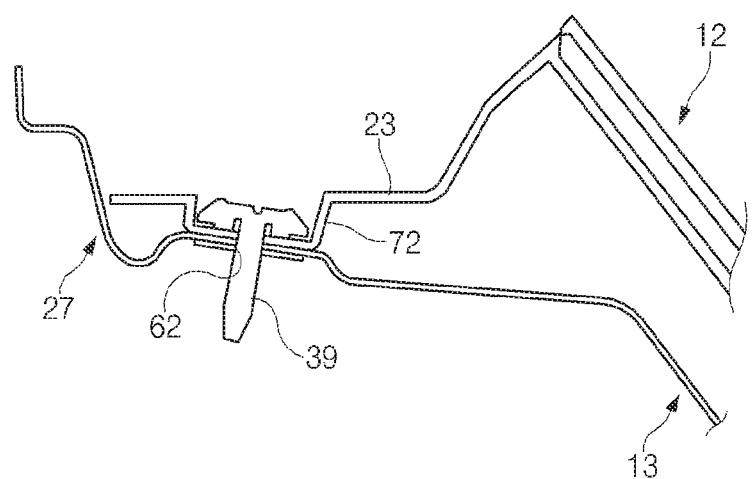
FIG. 15 illustrates the fastening of a screw to a second mounting hole of a quarter outer panel and a second mounting lug of a quarter garnish panel in a vehicle side outer structure according to an exemplary embodiment of the present disclosure.

The quarter garnish panel 12 may have a plurality of first mounting lugs 71 and a plurality of second mounting lugs 72 as illustrated in FIGS. 11 to 13. Each of the mounting lugs 71 and 72 may protrude toward the quarter outer panel 13 as illustrated in FIGS. 14 and 15. As illustrated in FIGS. 11 to 13, the plurality of second mounting lugs 72 may be formed on the rear edge 23 of the quarter garnish panel 12.

Referring to FIG. 11, in a state in which the quarter outer panel 13 is mounted on the master side outer panel 11, the quarter garnish panel 12 may be loaded toward the quarter outer panel 13 in a width direction of the vehicle (see arrow L in FIG. 11).

Referring to FIG. 14, a clip 37 of a synthetic resin material may be fastened to the first mounting lug 71 of the quarter garnish panel 12 and the first mounting hole 61 of the quarter outer panel 13. A sealing pad 38 may be disposed around the clip 37, thereby providing sealing between the first mounting lug 71 of the quarter garnish panel 12 and the first mounting hole 61 of the quarter outer panel 13. The clip 37 may be fastened to the first mounting lug 71 and the first mounting hole 61 in a first fastening direction (see X1 in FIG. 11) parallel to the loading direction of the quarter garnish panel 12 (see arrow L in FIG. 11).

Referring to FIG. 15, a bolt or screw 39 may be fastened to the second mounting lug 72 of the quarter garnish panel 12 and the second mounting hole 62 of the quarter outer panel 13. The screw 39 may be fastened to the second mounting lug 72 and the second mounting hole 62 in a second fastening direction (see X2 in FIG. 11) intersecting with the first fastening direction (see X1 in FIG. 11).

In other words, the quarter garnish panel 12 may be coupled to the quarter outer panel 13 using the fasteners such as the plurality of clips 37 and the plurality of screws 39.

Figure 16:
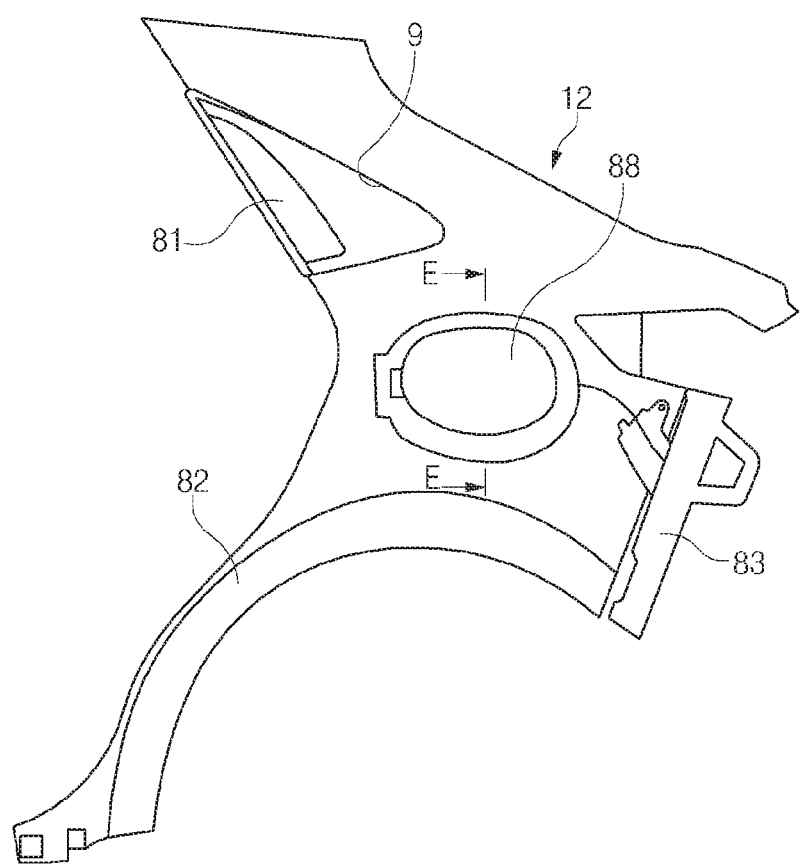
FIG. 16 illustrates a plurality of exterior components which are mounted on a quarter garnish panel in a vehicle side outer structure according to an exemplary embodiment of the present disclosure.
Figure 17:
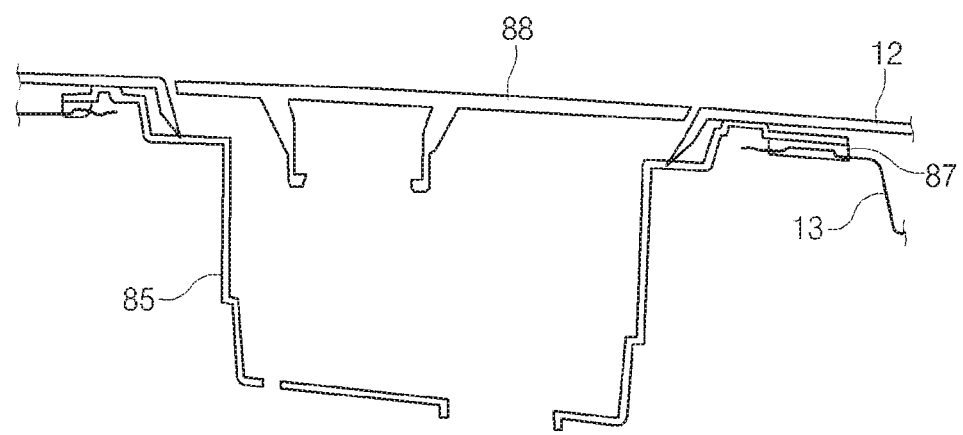
FIG. 17 illustrates a cross-sectional view, taken along line E-E of FIG. 16.

Referring to FIGS. 16 and 17, a plurality of exterior components such as a quarter fixed garnish 81, a quarter side garnish 82, a bumper side mounting bracket 83, and a fuel door housing 85 having a fuel door 88 may be preassembled with an exterior surface of the quarter garnish panel 12. Since the plurality of exterior components and the quarter garnish panel 12 form a preassembled module, the assembly thereof may be significantly improved.

The quarter fixed garnish 81, the quarter side garnish 82, the bumper side mounting bracket 83, and the like may be coupled to the exterior surface of the quarter garnish panel 12 using fasteners such as screws and bolts. The quarter fixed garnish 81 may be mounted on an edge of the opening 9 of the quarter garnish panel 12.

Referring to FIG. 17, the fuel door housing 85 may have an opening and the fuel door 88 opening and closing the opening. The fuel door 88 may be pivotally mounted on the fuel door housing 85. An edge of the fuel door housing 85 may be joined to the opening of the quarter garnish panel 12 by thermal fusion. A sealing pad 87 may be interposed on an overlapped portion of the edge of the fuel door housing 85, the quarter garnish panel 12, and the quarter outer panel 13, so that sealability between the quarter garnish panel 12 and the quarter outer panel 13 may be obtained. For example, the sealing pad 87 may be made of ethylene propylene rubber (EPR) or EPDM.

As set forth above, the vehicle side outer structure according to exemplary embodiments of the present disclosure may be capable of efficiently responding to partial design changes depending on various body types and vehicle models, thereby significantly reducing new mold manufacturing cost and investment cost.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle side outer structure, comprising:
a master side outer panel having a front door opening and a rear door opening; and
a quarter garnish panel joined to a rear edge of the master side outer panel, wherein the quarter garnish panel is changeable in response to a partial design change of a vehicle.

2. The vehicle side outer structure according to claim 1, wherein the quarter garnish panel is made of a synthetic resin material.

3. The vehicle side outer structure according to claim 1, further comprising a quarter outer panel sealably coupled to the rear edge of the master side outer panel, wherein the quarter garnish panel is coupled to the quarter outer panel using a plurality of fasteners.

4. The vehicle side outer structure according to claim 3, wherein the master side outer panel and the quarter outer panel are made of a same metal material.

5. The vehicle side outer structure according to claim 3, wherein:
the quarter outer panel has a plurality of first mounting holes;
the quarter garnish panel has a plurality of first mounting lugs;
a clip is fastened to each first mounting hole and its corresponding first mounting lug; and
a sealing pad is disposed around the clip.

6. The vehicle side outer structure according to claim 5, wherein:
the quarter outer panel has a plurality of second mounting holes;
the quarter garnish panel has a plurality of second mounting lugs; and
a screw is fastened to each second mounting hole and its corresponding second mounting lug.

7. The vehicle side outer structure according to claim 6, wherein the clip and the screw are fastened in different directions.

8. The vehicle side outer structure according to claim 3, wherein the quarter outer panel has a rear extension, and the rear extension and the quarter outer panel form a unitary one-piece structure.

9. The vehicle side outer structure according to claim 3, further comprising a quarter inner panel located inward from the quarter outer panel, wherein a front edge of the quarter inner panel is joined to the rear edge of the master side outer panel, and a rear edge of the quarter inner panel is joined to a rear edge of the quarter outer panel.

10. The vehicle side outer structure according to claim 3, wherein the quarter outer panel has a reinforcing bead, and the reinforcing bead is recessed toward an interior of the vehicle or is raised toward an exterior of the vehicle.

11. The vehicle side outer structure according to claim 1, wherein a plurality of exterior components are mounted on the quarter garnish panel.

12. The vehicle side outer structure according to claim 11, wherein the plurality of exterior components includes a quarter fixed garnish, a quarter side garnish, a bumper side mounting bracket, and a fuel door housing having a fuel door.

13. A vehicle side outer structure, comprising:
a master side outer panel having a front door opening and a rear door opening;
a quarter outer panel sealably coupled to a rear edge of the master side outer panel; and
a quarter garnish panel coupled to the quarter outer panel using a plurality of fasteners, wherein the quarter garnish panel is changeable in response to a partial design change of a vehicle.

14. The vehicle side outer structure according to claim 13, wherein:
the quarter garnish panel is made of a synthetic resin material; and
the master side outer panel and the quarter outer panel are made of a same metal material.

15. The vehicle side outer structure according to claim 13, wherein:
the quarter outer panel has a plurality of first mounting holes and a plurality of second mounting holes;
the quarter garnish panel has a plurality of first mounting lugs and a plurality of second mounting lugs;
a clip is fastened to each first mounting hole and its corresponding first mounting lug;
a sealing pad is disposed around the clip; and
a screw is fastened to each second mounting hole and its corresponding second mounting lug.

16. The vehicle side outer structure according to claim 15, wherein the clip and the screw are fastened in different directions.

17. The vehicle side outer structure according to claim 13, further comprising a quarter inner panel located inward from the quarter outer panel, wherein a front edge of the quarter inner panel is joined to the rear edge of the master side outer panel, and a rear edge of the quarter inner panel is joined to a rear edge of the quarter outer panel.

18. The vehicle side outer structure according to claim 13, wherein a plurality of exterior components are mounted on the quarter garnish panel, the plurality of exterior components including a quarter fixed garnish, a quarter side garnish, a bumper side mounting bracket, and a fuel door housing having a fuel door.

19. A vehicle comprising:
a master side outer panel having a front door opening and a rear door opening;
a quarter outer panel sealably coupled to a rear edge of the master side outer panel, the quarter outer panel having a plurality of first mounting holes and a plurality of second mounting holes;
a quarter garnish panel coupled to the quarter outer panel, the quarter garnish panel having a plurality of first mounting lugs and a plurality of second mounting lugs;
a clip fastened to each first mounting hole and its corresponding first mounting lug;
a sealing pad disposed around the clip;
a screw fastened to each second mounting hole and its corresponding second mounting lug; and
a plurality of exterior components mounted on the quarter garnish panel, the plurality of exterior components including a quarter fixed garnish, a quarter side garnish, a bumper side mounting bracket, and a fuel door housing having a fuel door.

20. The vehicle according to claim 19, further comprising a quarter inner panel located inward from the quarter outer panel, wherein a front edge of the quarter inner panel is joined to the rear edge of the master side outer panel, and a rear edge of the quarter inner panel is joined to a rear edge of the quarter outer panel.

* * * * *